(12) United States Patent
Seebohm et al.

(10) Patent No.: US 6,932,373 B2
(45) Date of Patent: Aug. 23, 2005

(54) ARTICULATED PENDULUM STEERING SYSTEM

(75) Inventors: Werner Seebohm, Konz (DE); Paul Kohn, Konz (DE)

(73) Assignee: Volvo Compact Equipment GmbH & Co., Konz-Konen (DE)

( * ) Notice: Subject to any disclaimer, the term of this patent is extended or adjusted under 35 U.S.C. 154(b) by 76 days.

(21) Appl. No.: 10/305,032

(22) Filed: Nov. 27, 2002

(65) Prior Publication Data

US 2003/0127828 A1 Jul. 10, 2003

(30) Foreign Application Priority Data

Nov. 30, 2001 (DE) .......................................... 101 58 912

(51) Int. Cl.$^7$ ................................................. B60D 1/00
(52) U.S. Cl. ..................................... 280/442; 280/492
(58) Field of Search ............................... 280/400, 442, 280/492

(56) References Cited

U.S. PATENT DOCUMENTS

| | | | | |
|---|---|---|---|---|
| 3,103,798 A | * | 9/1963 | Piatti .......................... | 464/128 |
| 3,212,290 A | * | 10/1965 | Walden ........................ | 464/88 |
| 3,912,300 A | * | 10/1975 | Bryan, Jr. .................... | 280/400 |
| 3,951,435 A | * | 4/1976 | Greatbach .................... | 280/477 |
| 4,147,375 A | | 4/1979 | Bangert et al. | |
| 4,667,763 A | | 5/1987 | Nembach | |
| 4,838,328 A | | 6/1989 | Herolf | |
| 4,890,684 A | * | 1/1990 | Simmons ..................... | 180/419 |
| 5,186,483 A | * | 2/1993 | Sheppard ..................... | 280/494 |
| H1846 H | | 4/2000 | Poorman | |
| 6,062,335 A | | 5/2000 | Renger et al. | |
| 6,206,118 B1 | * | 3/2001 | Menze et al. ............... | 180/14.1 |

* cited by examiner

*Primary Examiner*—Lesley D. Morris
*Assistant Examiner*—Matthew Luby
(74) *Attorney, Agent, or Firm*—Aslan Baghdadi Shaw Pittman LLP

(57) ABSTRACT

An articulated pendulum steering system for an articulated vehicle having a front vehicle section and a rear vehicle section, the system including a vertical bearing pin supported by at least one movable joint support, and a movable joint pin supported by at least one movable joint support, wherein the vertical bearing pin and the movable joint pin sit in an articulated pendulum joint axle.

33 Claims, 5 Drawing Sheets

ARTICULATED PENDULUM STEERING SYSTEM

This application claims priority to German Application No. 10158912.3, filed on Nov. 30, 2001, which is herein incorporated by reference in its entirety.

BACKGROUND

1. Field of the Invention

The present invention relates generally to an articulated pendulum steering system for an articulated vehicle. More particularly, the present invention relates to a steering mechanism for construction vehicles that is comprised of at least two sections for controlling both the steering motion and the pendulum motion between the front section and the rear section of the vehicle.

2. Background of the Invention

Construction vehicles, in particular wheeled loaders, are often employed in an environment where support conditions are loose or unstable. Therefore, it would be advantageous if construction vehicles were designed for optimum maneuverability and compactness.

In steering systems of construction vehicles that have a bearing pin and a joint pin, the pins are held in cylindrical bushings that are fitted onto the front vehicle section or the rear vehicle section. Continuous lubrication is required for the area of contact between the bearing pin and the bushing and/or the area of contact between the joint pin and the bushing. This presence of bushings and the need for continuous lubrication leads to increased maintenance costs during the operation of the construction vehicle. Additionally, the fact that often such construction vehicles are leased and sufficient lubrication of the components cannot be guaranteed leads to wear and significant maintenance costs.

SUMMARY OF THE INVENTION

Therefore, it is an object of the present invention to provide an articulated pendulum steering system that can be maintenance free or low maintenance. It is also an object of the present invention to provide an articulated pendulum steering system that facilitates the designing of a construction vehicle to be compact and maneuverable.

The present invention is directed to an articulated pendulum steering system for construction vehicles, in particular for wheeled loaders, which connects the front vehicle section to the rear vehicle section to provide both operator controlled steering motion and a pendulum motion between both vehicle sections. The steering motion causes a swivel movement of the front vehicle section or front frame of from about +40' to about −40° around the vertical steering axle of the articulated pendulum steering system. The pendulum motion causes the front vehicle section or front frame to pivot a few degrees around an almost horizontal axle. One advantage of using an articulated pendulum steering system to fasten the front vehicle section to the rear vehicle section is that the wheel axles of the construction vehicle can be fastened easily.

In order to perform the pendulum motion using simple articulated steering, it is necessary to take other measures such as, for example, oscillation of the rear axle.

These objects are achieved in accordance with an embodiment of the invention by holding the vertical bearing pin in two articulated joint bearings and by holding the movable joint pin in two pendulum joint bearings. The vertical bearing pin is thus held both in the upper and in the lower section by an articulated joint bearing and the movable joint pin is held both in the center and at the rear by a pendulum joint bearing. The present invention facilitates the design or production of a particularly compact construction vehicle by fitting one of the pendulum joint bearings on the front side of the movable joint pin and the other pendulum joint bearing in the center of the articulated pendulum joint.

The joint bearings used in the articulated pendulum joint according to the invention have a movable joint ring that sits on the respective bearing pin, the inner surface of the movable joint ring is flat (inner surface) and the outer surface of said movable joint ring is curved (curved outer surface). The mating connector of the movable joint ring is a bearing shell that has a correspondingly curved opening to, at least partially, be able to receive the movable joint ring.

The bearing shells of both articulated joint bearings are fitted into the front vehicle section of the construction vehicle and the bearing shell of one pendulum joint bearing is fitted on rear vehicle and another bearing shell is fitted on the movable joint pin.

The use of joint bearings rather than bearing pins minimizes the area of contact surface between the mechanical components that pivot against each other. Accordingly, it becomes relevant from a cost effective perspective to choose a high quality but low maintenance material for the coating and/or for the mechanical components that are in contact with each other.

BRIEF DESCRIPTION OF THE DRAWINGS

The figures merely represent one possible embodiment of the present invention. The figures are not intended to limit the invention to the one preferred embodiment described in the drawings. They show.

Figure 1:
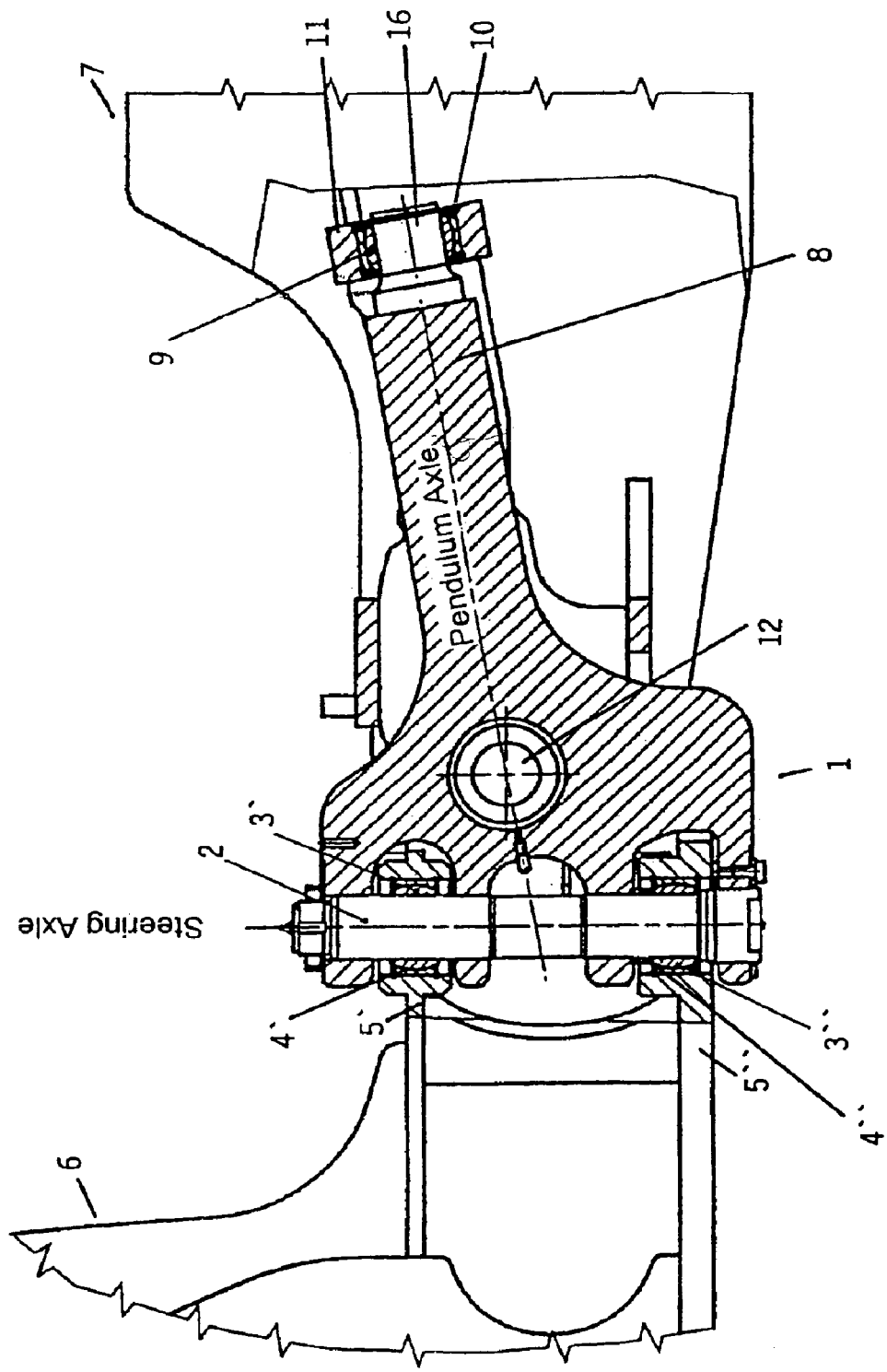
FIG. 1 shows a side view of a cross section of an exemplary articulated pendulum joint according to an embodiment of the invention.

The following figure legend identifies examples of some of the structures discussed in the figures and in the detailed description of the embodiments.

1 articulated pendulum joint axle
2 vertical bearing pin (vertical pin) (VBP)
3' first bearing ring
3" second bearing ring
4' first bearing shell
4" second bearing shell
5' arm
5" arm
6 front vehicle section
7 rear vehicle section
8 movable joint pin
9 third bearing ring
10 third bearing shell (for third bearing ring)
11 stabilizer bar or crossbeam of rear vehicle section 12 horizontal bearing pin (HBP)
13 fourth bearing ring
14 panel
15 protrusion(s) that carry horizontal bearing pin
16 extension pin
17 fourth bearing shell

DETAILED DESCRIPTION OF THE INVENTION

FIG. 1 is a side view of a cross section of an exemplary articulated pendulum steering system according to an embodiment of the invention including an articulated pendulum joint axle 1. The articulated pendulum joint axle 1 houses the pendulum axle, the steering axle and the extension pin 16. The steering axle houses the vertical bearing pin 2; the pendulum axle houses the extension pin 16. The horizontal bearing pin 12 is located in the articulated pendulum joint axle 1 at a point between the steering axle and the pendulum axle. In both the upper and the lower sections of the vertical bearing pin 2, sit the first and second bearing rings, 3' and 3" respectively; these bearing rings support the steering axle, which is preferably an articulated steering axle. The mating connector includes the first and second bearing shells 4' and 4" for the first and second bearing rings 3' and 3"; the first bearing shell is fitted on an arm 5' and the second bearing shell is fitted on an arm 5". Each of the arms 5' and 5" are on the front vehicle section 6 of the construction vehicle.

An extension pin 16, which is also fitted with a third bearing ring 9 towards its end, is arranged on the front side of the movable joint pin 8 centrally to the pendulum axle for the support of the pendulum axle. This mating connector includes the third bearing shell 10, which is fitted onto a stabilizer bar crossbeam 11 on the rear vehicle section 7. It is clear from this view that both arms 5' and 5" extend into the fork-like structural openings of the articulated pendulum joint axle 1. A horizontal bearing pin 12 for the support of the pendulum axle is fitted parallel to the cross axis of the construction vehicle approximately in the center of the articulated pendulum joint.

Figure 2:
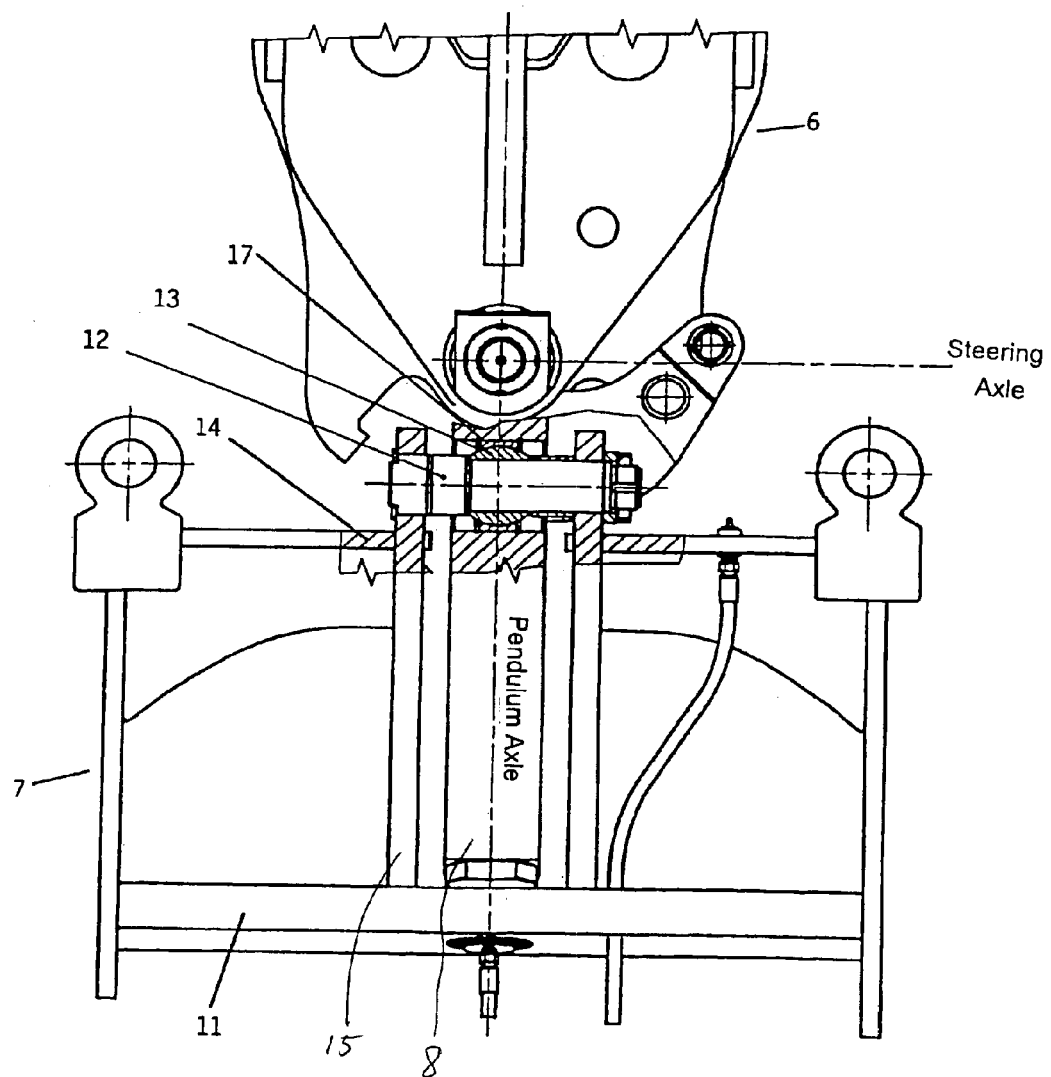
FIG. 2 shows a plan view of a cross section through an exemplary articulated pendulum joint according to an embodiment of the invention.

FIG. 2 shows a plan view of a cross section through the articulated pendulum steering system, according to one embodiment of the invention. The horizontal bearing pin 12 is held in place by a pendulum joint support approximately in the center of it. A fourth bearing ring 13, which sits on the horizontal bearing pin 12, is circular; the inner surface of the fourth bearing ring 13 lies flat against the bearing pin 12. The curved outer surface of the bearing ring 13 fits in the cup shaped opening of the fourth bearing shell 17 at the movable joint pin 8. The forward pointing end of the pendulum axle runs centrally along the longitudinal section through the fourth bearing ring 13 and the rearwards pointing end runs centrally through the cross section of the third bearing ring 9 which is not visible in this view since it is fitted in the stabilizer bar 11, which is the crossbeam of the rear vehicle section. The panel 14, which is positioned separately from to the articulated pendulum joint axle 1, limits the pendulum motion as it reaches the position stop on same.

Figure 3:
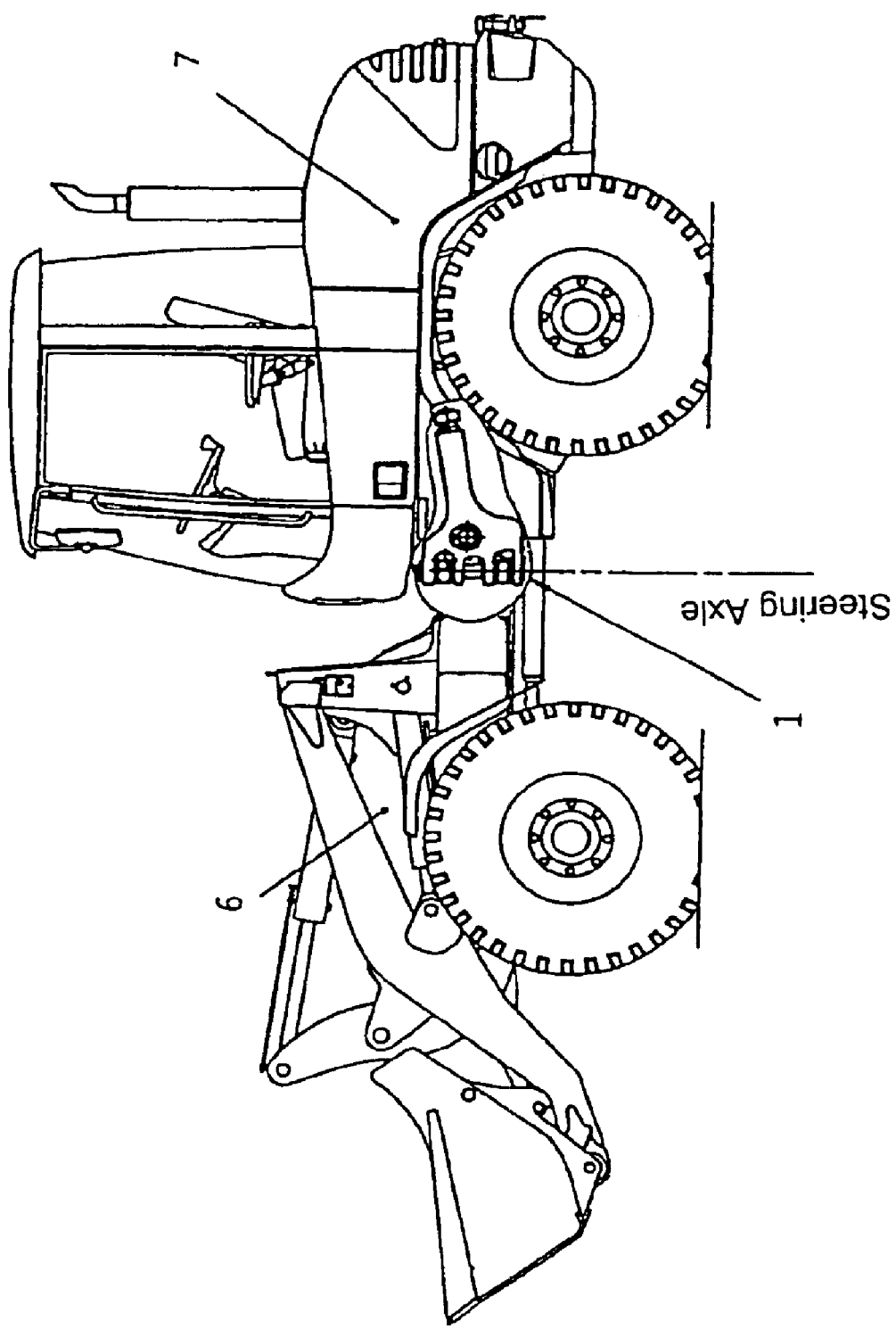
FIG. 3 shows an exemplary construction vehicle fitted with an exemplary articulated pendulum joint according to an embodiment of the invention.

FIG. 3 shows a wheeled loader fitted with an exemplary articulated pendulum steering according to an embodiment of the invention. Both the precisely vertically aligned steering axle and the virtually horizontally aligned movable joint pin 8 are evident from the figure. In this embodiment, the movable joint pin 8 is not precisely horizontal but rather is arranged in a slightly ascending position to allow the extension of the pendulum axle to run above the center of gravity of the rear vehicle section 7 of the wheeled loader. This advantageous alternative pendulum axle tilting enables the pendulum axle to run upwards in the direction of the rear of the vehicle which means that when the lifter arm of, for example, a wheeled loader is impacted with such force that the rear wheels are raised from the ground, the rear vehicle section 7 will not tip about the pendulum axle because the center of gravity lies under the pendulum axle.

Figure 4:
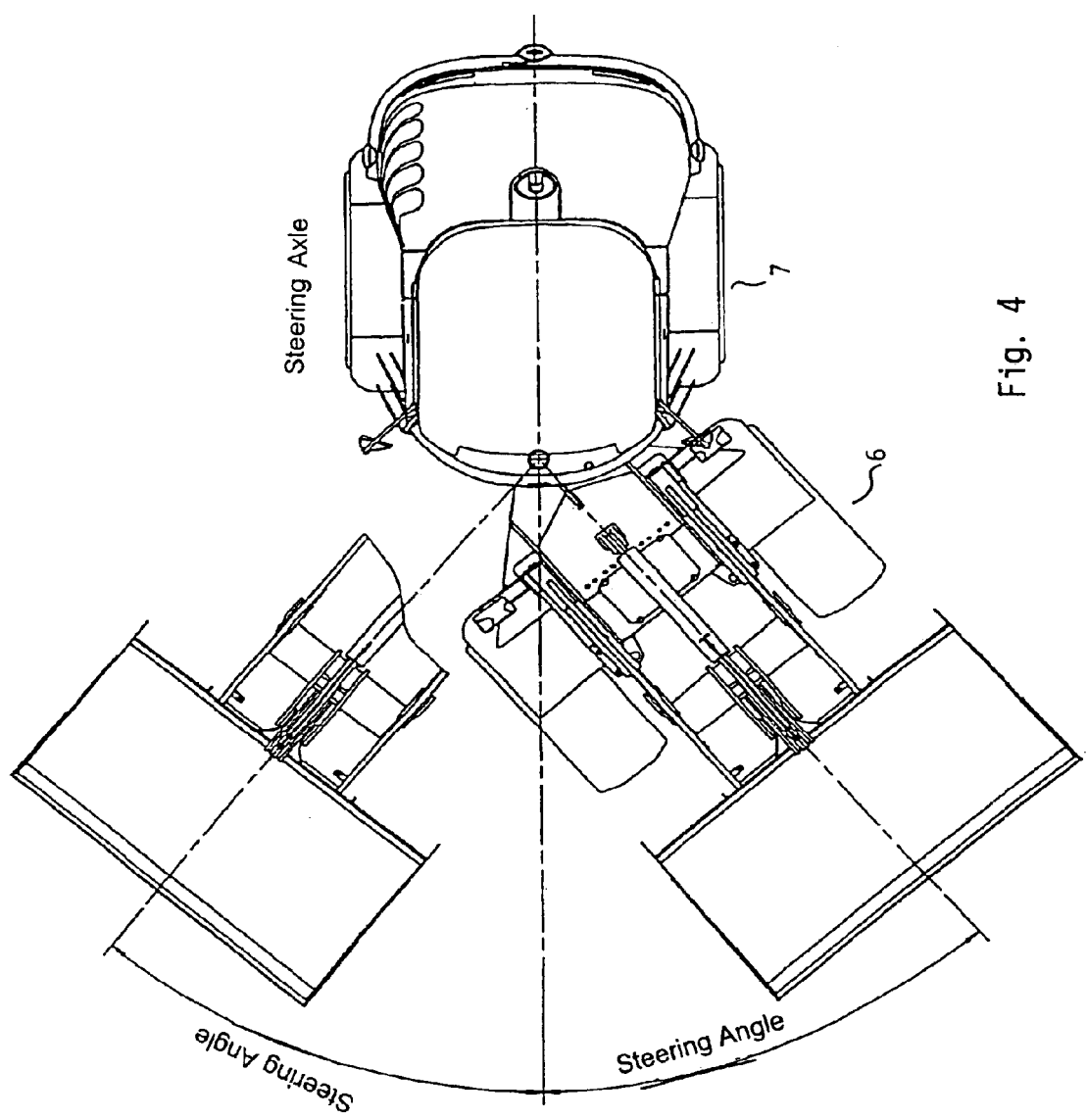
FIG. 4 shows a plan view of an exemplary construction vehicle and the maximum possible steering angle.

FIG. 4 shows a plan view of the embodiment with a wheeled loader. The drawing indicates that, in one embodiment of the instant invention, the maximum possible articulation angle and/or the maximum steering angle, when the vehicle is driven straight, is plus or minus 40° from the base line.

Figure 5:
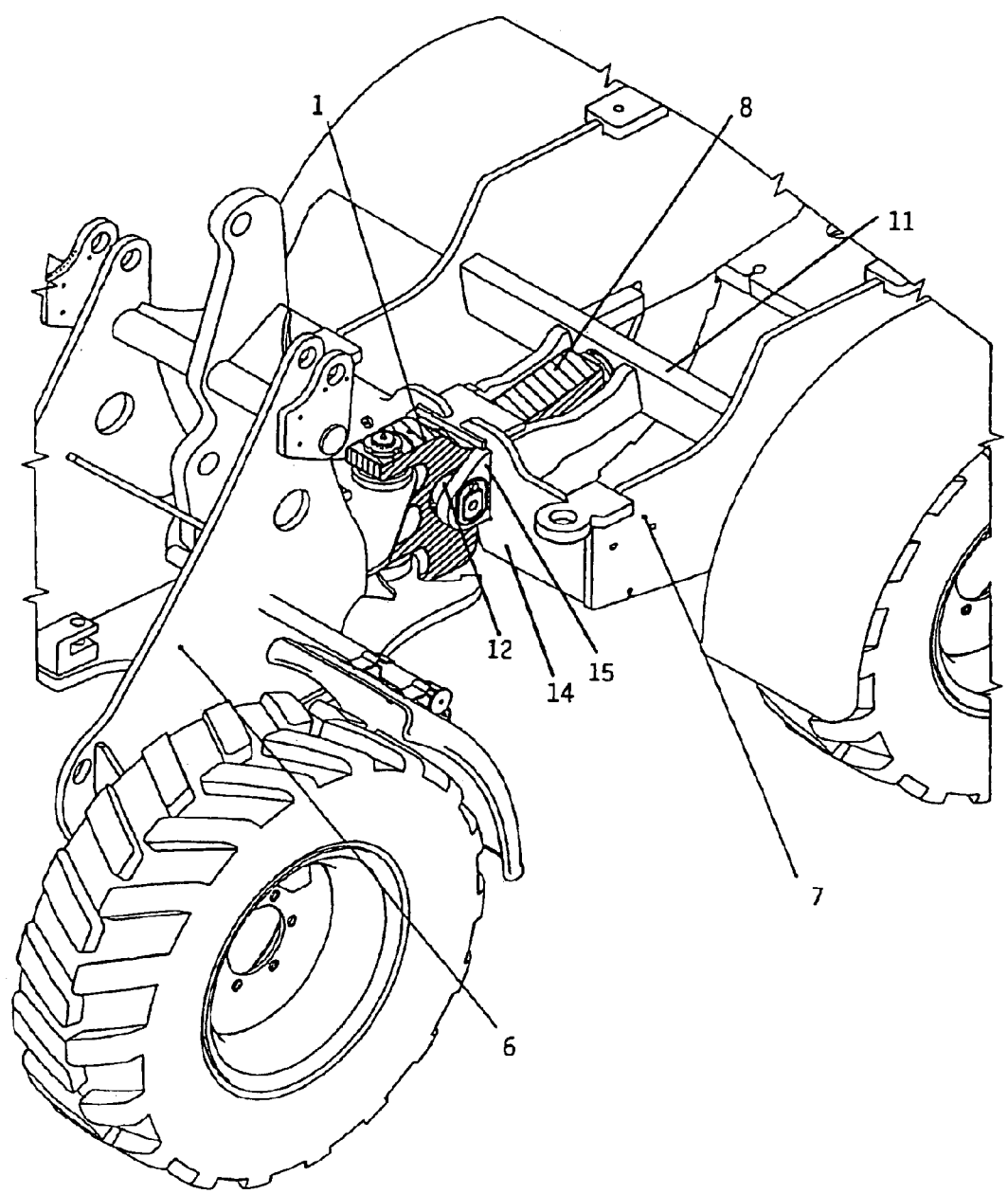
FIG. 5 shows a perspective view of an exemplary articulated pendulum joint according to an embodiment of the present invention.

FIG. 5 shows a perspective view of the articulated pendulum joint axle 1 that clearly shows how the movable joint pin 8 is attached onto the rear vehicle section 7. The third bearing shell 10 may be fitted on the stabilizer bar/cross beam 11 and/or the protrusions (of which only the one, numbered 15, is visible) that carry the horizontal bearing pin 12. The movable joint pin 8 is, at least partially, angular in the upper section. A panel 14 that functions as the front panel for the rear vehicle section 7 is positioned separately from the movable joint pin 8 and is firmly attached to the rear vehicle section 7, where it limits the pendulum motion.

In one preferred embodiment of the instant invention, at least one of bearing rings 3', 3", 9 or 13 is Teflon coated. In yet another preferred embodiment of the instant invention, at least one of bearing shells 4', 4", 10 or 17 is Teflon coated. In another preferred embodiment of the instant invention, at least some of the sliding surfaces of the components are lubricated.

Thus, as one of ordinary skill in the art would appreciate from the foregoing, the present invention is directed to an articulated pendulum steering system for construction vehicles, in particular, for wheeled loaders. The articulated pendulum steering system connects the front vehicle section to the rear vehicle section to provide both operator controlled steering motion and a pendulum motion between both vehicle sections. The basic components of an exemplary articulated pendulum steering system are a vertical bearing pin and a movable joint pin, each supported by a movable joint support. The center of gravity of the rear vehicle section lies under the pendulum axle. The vertical bearing pin (VBP) is held in two articulated joint bearings, which are located at the upper and lower section of the VBP. The movable joint pin (MJP) is held in two pendulum joint bearings, which are located at the center and at the rear of the MJP. First and second bearing rings sit on the vertical pin, both in the upper and in the lower area; the bearing rings are held in place by first and second bearing shells, which are cup shaped supports. Each bearing shell for the vertical pin is fitted onto one of two arms on the front vehicle section. The two arms extend into fork-like structural openings in the articulated pendulum joint. An extension pin is fitted on the rearward front side of the movable joint pin. On the extension pin sits a third bearing ring, which is held in place by a third bearing shell that is fitted onto the cross beam/stability bar of the rear vehicle section. Approximately in the center of the movable joint pin, a horizontal bearing pin is fitted in a lateral direction to the vehicle. In the center of the horizontal bearing pin sits a fourth bearing ring, which is held in place by a fourth bearing shell that is fitted onto the rear vehicle section. The bearing rings and/or bearing shells may be coated; examples of such coatings include Teflon. The contact surfaces of the components that pivot against each other may be lubricated.

In describing representative embodiments of the invention, the specification may have presented the method and/or process of the invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the invention should not be limited to the performance of their steps in the order written, and one skilled in the art can readily appreciate that the sequences may be varied and still remain within the spirit and scope of the invention.

The foregoing disclosure of the embodiments of the invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

What is claimed is:

1. An articulated pendulum steering system for an articulated vehicle having a front vehicle section and a rear vehicle section, said system comprising: a vertical bearing pin supported by at least one first movable joint support; and a movable joint pin supported by at least one second movable joint support, each pin sitting in an articulated pendulum joint axle, wherein said first movable joint support for the vertical bearing pin is comprised of at least two articulated joint bearings.

2. The articulated steering system of claim 1 wherein said second movable joint support for the movable joint pin is comprised of at least two pendulum joint bearings.

3. The articulated steering system of claim 1, wherein said articulated joint bearings are located at the upper and lower section of the vertical bearing pin.

4. The articulated steering system of claim 2, wherein said pendulum joint bearings are located at the center and at the rear of the movable joint bearing pin.

5. The articulated pendulum steering system of claim 1, wherein each of said articulated joint bearings comprise a first bearing ring on the upper area of said vertical bearing pin and a second bearing ring on the lower area of said vertical bearing pin.

6. The articulate pendulum steering system of claim 5, wherein each of said first and second bang rings is supported by a bearing shell, wherein each of said bearing shells is fitted on the front vehicle section.

7. The articulated pendulum steering system of claim 6, wherein said each bearing shell is fitted to a separate arm on the front vehicle section, and further wherein ach of said arms extend into a separate structural opening in an opening end of the articulated pendulum joint axle.

8. The articulated pendulum steering system of any of claims 1 and 2–7, further comprising an extension pin, wherein said extension pin is fitted on a rear front axle of said movable joint pin.

9. The articulated pendulum steering system of claim 8, further comprising a third bearing ring that is fitted on said extension pin.

10. The articulated pendulum steering system of claim 9, wherein said third bearing ring is held in place by a third bearing shell, wherein said third bearing shell is fitted onto the rear vehicle section.

11. The articulated pendulum steering system of claim 10, wherein said third bearing shell is attached to a cross beam on said rear vehicle section.

12. The articulated pendulum steering system of claim 11, wherein said articulated pendulum joint axle further comprises a horizontal bearing pin, wherein said horizontal bearing pin is located in about the center of said articulated pendulum joint axle.

13. The articulated pendulum steering system of claim 12, further comprising a fourth bearing ring, wherein said fourth bearing ring sits in the center of the horizontal bearing pin.

14. The articulated pendulum steering system of claim 13, further comprising a fourth bearing shell for the fourth bearing ring, wherein said fourth bearing shell is fitted on the rear vehicle section.

15. The articulated pendulum steering system of claim 1, wherein said articulated pendulum joint axle is comprised of a pendulum axle and a steering axle.

16. The articulated pendulum steering system of claim 15, wherein said pendulum axle is slightly elevated in rearwards direction.

17. The articulated pendulum steering system of claim 15, wherein the center of gravity of the rear vehicle section lies under the pendulum axle.

18. The articulated pendulum steering system of claims 1, 5 or 11, wherein a surface of at least one bearing ring is coated with Teflon, wherein said surface is selected from the group consisting of the inner surface and the curved outer surface.

19. The articulated pendulum steering system of claims 1, 6 or 10, wherein at least one bearing shell is either coated with Teflon on its curved outer surface and/or at least one bearing shell is made of Teflon.

20. The articulated pendulum steering system of claim 1 wherein said vertical bearing pin is comprised of two components.

21. The articulated pendulum steering system of claim 1, wherein said system is capable of providing a steering motion of plus or minus 40° from the direction that the vehicle is operated.

22. The articulated pendulum steering system of claim 1, wherein said system provides a pendulum motion between the front vehicle section and the rear vehicle section, wherein said pendulum motion is limited.

23. The articulated pendulum steering system of claim 1, wherein a front panel of the rear vehicle section functions as a position stop during the pendulum motion.

24. The articulated pendulum steering system of claim 1, wherein at least one of several contact surfaces on the components that pivot against each other are lubricated.

25. The articulated steering system of claim 1, wherein said articulated pendulum joint axle comprises at least two structural openings at one end.

26. The articulated pendulum steering system of claim 8, wherein said articulated pendulum joint axle further comprises a horizontal bearing pin, wherein said horizontal bearing pin is located in about the center of said articulated pendulum joint axle.

27. The articulated pendulum steering system of claim 9, wherein said articulated pendulum joint axle further comprises a horizontal bearing pin, wherein said horizontal bearing pin is located in about the center of said articulated pendulum joint axle.

28. The articulated pendulum steering system of claim 10, wherein said articulated pendulum joint axle further comprises a horizontal bearing pin, wherein said horizontal bearing pin is located in about the center of said articulated pendulum joint axle.

29. The articulated pendulum steering system of claim 11, wherein said articulated pendulum joint axle further comprises a horizontal bearing pin, wherein said horizontal bearing pin is located in about the center of said articulated pendulum joint axle.

30. An articulated pendulum steering system for an articulated vehicle having a front vehicle section and a rear vehicle section, said system comprising:

a vertical bearing pin supported by a first movable joint support;

a movable joint pin supported by a second movable joint support, each pin sitting in an articulated pendulum joint axle;

at least two articulated joint bearings of the first moveable joint support including a first and second articulated joint bearings located, respectively, at an upper and a lower section of the vertical bearing pin, wherein the first articulated joint bearing located at the upper section of the vertical bearing pin includes a first bearing ring and a first bearing shell supporting the first bearing ring, and the second articulated joint bearing located at the lower section of the vertical bearing pin includes a second bearing ring and a second bearing shell supporting the second bearing ring, and wherein each of the first and second shell are fitted on the front vehicle section;

at least two pendulum joint bearings of the second moveable joint support including a third and fourth pendulum joint bearings located, respectively, at a center and a rear section of the moveable joint bearing pin, wherein the third pendulum joint bearing includes a third bearing ring and a third bearing shell supporting the third bearing ring, and the fourth pendulum joint bearing includes a fourth bearing ring and a fourth bearing shell supporting the fourth bearing ring;

an extension of the movable joint pin being fitted on a rear front axle of the movable joint pin, wherein the third bearing ring of the third pendulum joint is fitted on the extension pin.

31. The articulated pendulum steering system of claim 30, wherein the third bearing ring of the third pendulum joint bearing is held in place by a third bearing shell that is fitted onto the rear vehicle section.

32. The articulated pendulum steering system of claim 31, wherein the third bearing shell is attached to a cross beam on the rear vehicle section.

33. The articulated pendulum steering system of claim 30, wherein the rear vehicle section includes a front panel functioning as a position stop during a pendulum motion.

* * * * *